US010328893B2

(12) United States Patent
Shimazaki et al.

(10) Patent No.: US 10,328,893 B2
(45) Date of Patent: Jun. 25, 2019

(54) WEBBING FOR PASSENGER RESTRAINT BELT, SEAT BELT AND SEAT BELT APPARATUS

(71) Applicant: TAKATA CORPORATION, Tokyo (JP)

(72) Inventors: Sadayuki Shimazaki, Shiga (JP); Daichi Nemoto, Shiga (JP); Hiroki Terai, Shiga (JP)

(73) Assignee: TAKATA CORPORATION, Tokyo (JP)

( * ) Notice: Subject to any disclaimer, the term of this patent is extended or adjusted under 35 U.S.C. 154(b) by 86 days.

(21) Appl. No.: 15/466,125

(22) Filed: Mar. 22, 2017

(65) Prior Publication Data
US 2017/0282851 A1 Oct. 5, 2017

(30) Foreign Application Priority Data

Mar. 31, 2016 (JP) ................. 2016-071587

(51) Int. Cl.
*B60R 22/12* (2006.01)
*B60R 22/34* (2006.01)
*D03D 15/00* (2006.01)
*D03D 1/00* (2006.01)

(52) U.S. Cl.
CPC ............. *B60R 22/12* (2013.01); *B60R 22/34* (2013.01); *D03D 1/0005* (2013.01); *D03D 15/00* (2013.01); *D10B 2401/16* (2013.01)

(58) Field of Classification Search
CPC ...... B60R 22/12; B60R 22/34; D03D 1/0005; D03D 15/00; D10B 2401/16
See application file for complete search history.

(56) References Cited

U.S. PATENT DOCUMENTS

| 6,419,263 | B1* | 7/2002 | Busgen | B60R 21/18 |
| | | | | 139/389 |
| 9,488,610 | B2* | 11/2016 | Heppe | A61M 1/3661 |
| 2002/0008376 | A1 | 1/2002 | Wittenberg | |
| 2007/0197115 | A1* | 8/2007 | Eves | D03D 1/0088 |
| | | | | 442/194 |
| 2013/0193727 | A1 | 8/2013 | Rodemer | |
| 2014/0262478 | A1 | 9/2014 | Harris et al. | |
| 2017/0029985 | A1* | 2/2017 | Tajitsu | D03D 15/00 |

(Continued)

FOREIGN PATENT DOCUMENTS

DE 100 26 444 C2 12/2001
DE 10 2010 014 366 A1 11/2010

(Continued)

OTHER PUBLICATIONS

The extended European search report dated Jun. 30, 2017, issue in corresponding European Patent Application No. 17162262.4. (5 pages).

*Primary Examiner* — Faye M Fleming
(74) *Attorney, Agent, or Firm* — Fitch, Even, Tabin & Flannery LLP

(57) ABSTRACT

A webbing for a passenger restraint belt forms a long passenger restraint belt to restrain a vehicle passenger. The webbing includes warp yarns and weft yarns. The warp yarns and weft yarns are woven so as to extend orthogonally to each other. The warp yarn includes at least one conductive yarn and non-conductive yarns. A non-conductive yarn is thicker than the at least one conductive yarn.

10 Claims, 4 Drawing Sheets

(56) References Cited

U.S. PATENT DOCUMENTS

| | | | |
|---|---|---|---|
| 2017/0370030 A1* | 12/2017 | Podhajny | D03D 1/0088 |
| 2018/0171514 A1* | 6/2018 | Cobanoglu | G01K 7/003 |
| 2018/0183024 A1* | 6/2018 | Zhamu | H01M 10/0525 |
| 2018/0195218 A1* | 7/2018 | Hamada | D04B 21/14 |

FOREIGN PATENT DOCUMENTS

| | | |
|---|---|---|
| DE | 10 2011 009 318 A1 | 7/2012 |
| EP | 1 998 985 B1 | 12/2008 |
| EP | 2 399 477 B1 | 10/2014 |
| JP | 2010-7201 A | 1/2010 |
| JP | 2013-140754 A | 7/2013 |
| JP | 20013-140754 A | 7/2013 |
| JP | 2015-199438 A | 11/2015 |

* cited by examiner

US 10,328,893 B2

WEBBING FOR PASSENGER RESTRAINT BELT, SEAT BELT AND SEAT BELT APPARATUS

CROSS-REFERENCE TO RELATED APPLICATION

This application claims the benefit of Japanese Patent Application No. 2016-071587, filed on Mar. 31, 2016, the entire contents of which are hereby incorporated by reference, the same as if set forth at length herein.

TECHNICAL FIELD

The present invention relates to a webbing for a passenger restraint belt, a seat belt and a seat belt apparatus.

BACKGROUND ART

Conductive fabric including conductive yarns is known to those skilled in the art. For example, the conductive fabric is used as a seat cover of a vehicle seat having a seat heater or a sitting sensor. Conductive fabric is disclosed in JP-A-2010-7201 which includes microfiber having a single fiber diameter of 10 to 1000 nm, and conductive fiber having a single fiber diameter of more than 1000 nm.

It is considered to use conductive cloth for a webbing serving as a long passenger restraint belt (seat belt) that restrains a passenger in a vehicle. The webbing runs while being in sliding contact with several members, such as a webbing guide, when the webbing is drawn out from or wound in a winding apparatus (retractor). When the conductive cloth disclosed in JP-A-2010-7201 is used for the webbing, the conductive fiber having a large single fiber diameter slides with the webbing guide or the like, so that the conductive fiber may be worn out and broken (cut).

SUMMARY OF INVENTION

Technical Problem

An object of the invention is to provide a webbing for a passenger restraint belt that is capable of preventing conductive yarn from being worn out, a seat belt and a seat belt apparatus using the same.

Solution to Problem

A webbing for a passenger restraint belt forms a long passenger restraint belt to restrain a vehicle passenger. The webbing includes warp yarns and weft yarns. The warp yarns and weft yarns are woven so as to extend orthogonally to each other. The warp yarn includes at least one conductive yarn and non-conductive yarns. A non-conductive yarn is thicker than the at least one conductive yarn.

In the webbing for the passenger restraint belt, the one conductive yarn is formed between the two non-conductive yarns.

In the webbing for the passenger restraint belt, the warp yarn includes a plurality of conductive yarns.

In the webbing for the passenger restraint belt, at least one non-conductive yarn is disposed between first and second conductive yarns.

In the webbing for the passenger restraint belt, the conductive yarn is formed by convergence of a plurality of conductive filaments.

A seat belt includes a passenger restraint belt formed using the webbing.

A seat belt apparatus includes the seat belt, a retractor, a buckle and a tongue. The retractor is configured to wind the seat belt. The buckle is fixed to a vehicle. The tongue is provided on the seat belt and that is engages with the buckle.

In the seat belt apparatus, an electric device connected electrically to the conductive yarn is provided on the seat belt.

Advantageous Effects of Invention

According to the invention, since a non-conductive warp yarn is thicker than conductive yarn thereof, it is possible to protect the conductive yarn from another member and to suppress the conductive yarn from being worn out when a webbing slides with another member.

DESCRIPTION OF EMBODIMENTS

Figure 1:
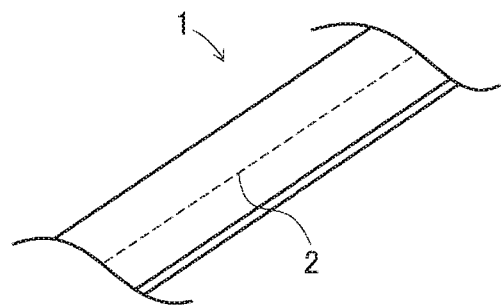
FIG. 1 is a perspective view illustrating a webbing according to an embodiment of the invention.
Figure 2:
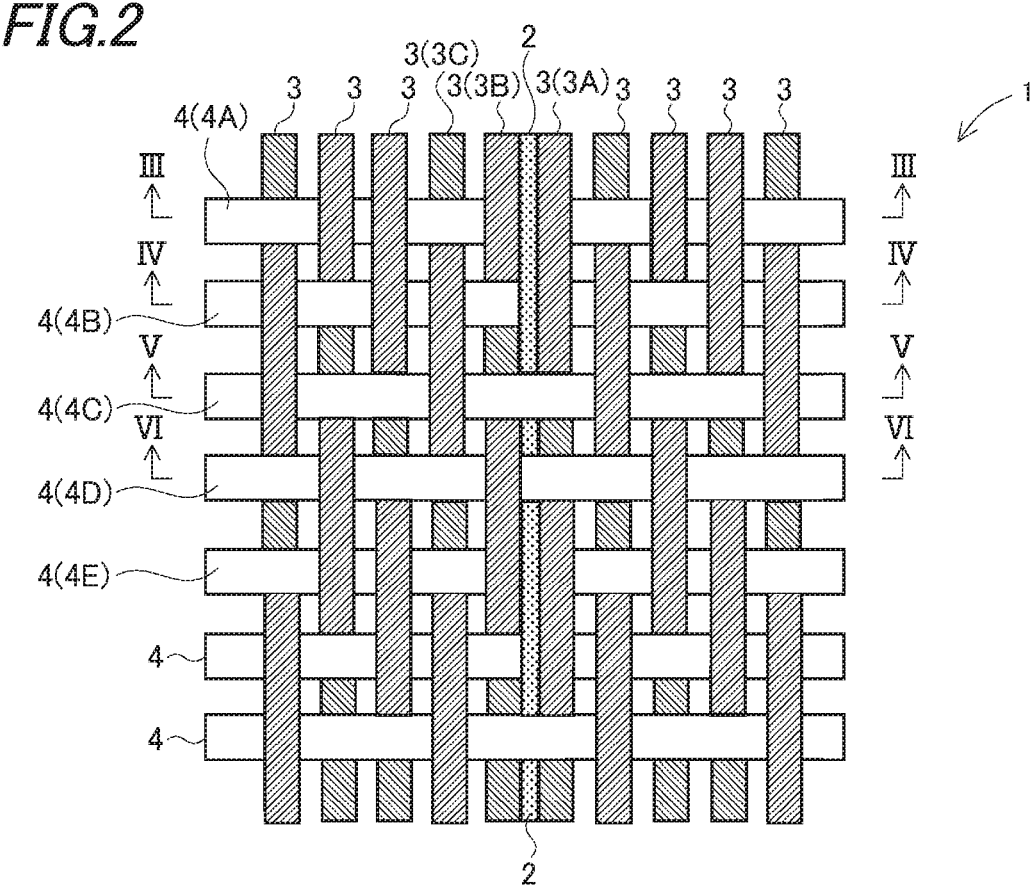
FIG. 2 is an enlarged plan view illustrating the webbing according to the embodiment.

Hereinafter, embodiments of the invention will be described with reference to the accompanying drawings. FIG. 1 is a perspective view illustrating a webbing for a passenger restraint belt according to an embodiment of the invention, FIG. 2 is an enlarged plan view illustrating the webbing, and FIGS. 3 to 6 are sectional views taken along lines III-III, IV-IV, V-V and VI-VI of FIG. 2, respectively.

The webbing 1 of this embodiment is fabric in which warp and weft yarns are woven so as to extend orthogonally to each other, and is woven in the form of a 2/2 twill weave, for example. One of a plurality of warp yarns is a conductive yarn 2, and the other warp yarns are non-conductive yarns 3. The conductive yarn 2 is formed in a longitudinal direction of the webbing 1. Weft yarns 4 are non-conductive yarns.

A method of weaving the warp yarns (conductive yarns 2 and non-conductive yarns 3) with the weft yarns 4 will be described with reference to FIG. 2. The warp yarn repeatedly passes over two weft yarns 4 and then passes below two weft yarns 4. For example, the non-conductive yarn 3A passes over the weft yarns 4A and 4B and passes below the weft yarns 4C and 4D.

After the non-conductive yarn 3B that is adjacent to the non-conductive yarn 3A while the yarns are disposed on opposite sides of the conductive yarn 2 passes over the weft yarn 4A, the non-conductive yarn sequentially passes below the weft yarns 4B and 4C and over weft yarns 4D and 4E. After the non-conductive yarn 3C adjacent to the non-conductive yarn 3B passes below the weft yarn 4A, the non-conductive yarn sequentially passes over the weft yarns 4B and 4C and below the weft yarns 4D and 4E.

A method of extending the conductive yarn 2 between the two non-conductive yarns 3A and 3B and intersecting with the weft yarn 4 is the same as the method applied to one (non-conductive yarn 3A, in an example illustrated in FIG. 2) of the two non-conductive yarns 3A and 3B. That is, the conductive yarn 2 passes over the weft yarns 4A and 4B and below the weft yarns 4C and 4D.

The conductive yarn 2 is multifilament yarn that is produced by twisting and joining a plurality of conductive filaments together. The conductive filament may use, for example, polyester fiber or nylon fiber coated with metal such as copper, by a vacuum deposition method or the like. A denier (fineness) of the conductive yarn 2 that is the multifilament yarn is 750 D or less.

The non-conductive yarn 3 may use polyester fiber, nylon fiber or the like, and is thicker than the conductive yarn 2. Preferably, a denier (fineness) of the non-conductive yarn 3 is 1.3 times or more, particularly 2 to 6 times as thick as the conductive yarn 2. The weft yarn 4 may use polyester fiber, nylon fiber or the like, and has a denier (fineness) of about 250 to 1000 D.

Figure 3:
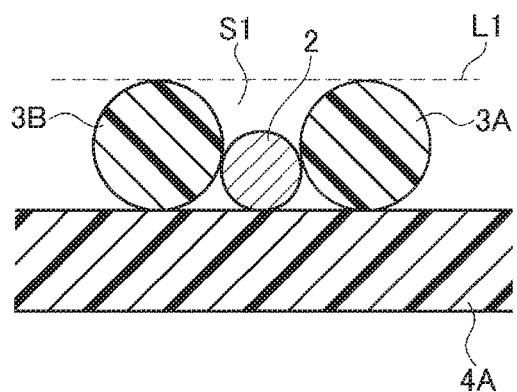
FIG. 3 is a sectional view taken along line III-III of FIG. 2.
Figure 4:
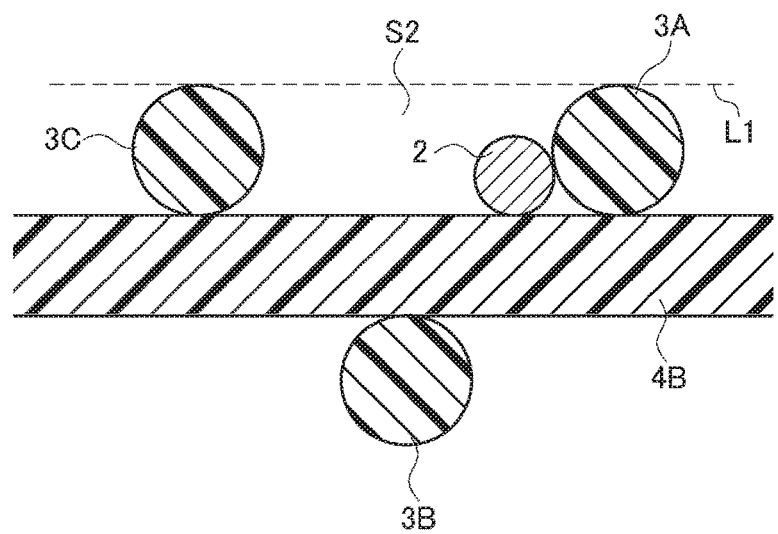
FIG. 4 is a sectional view taken along line IV-IV of FIG. 2.

Since the conductive yarn 2 is thinner than the non-conductive yarn 3, as illustrated in FIG. 3, a top of the conductive yarn 2 is located to be lower than tops of the non-conductive yarns 3A and 3B that are adjacent thereto, in a place where the conductive yarn intersects with the non-conductive yarns. Further, as illustrated in FIG. 4, in a place where the conductive yarn 2 intersects with the weft yarn 4B, the top of the conductive yarn 2 is located to be lower than the top of the non-conductive yarn 3A and a top of the non-conductive yarn 3C that is adjacent to the non-conductive yarn 3B.

When an upper surface of the webbing 1 is in slidably contact with another member, the conductive yarn 2 is located in spaces S1 and S2 surrounded by a sliding surface L1, the non-conductive yarns 3A to 3C, and the weft yarns 4A and 4B of the associated member, and the top of the conductive yarn 2 is not in contact with the associated member or a frictional force may be suppressed even if there is contact between the conductive yarn and the associated member. Thus, the abrasion of the conductive yarn 2 is suppressed.

Figure 5:
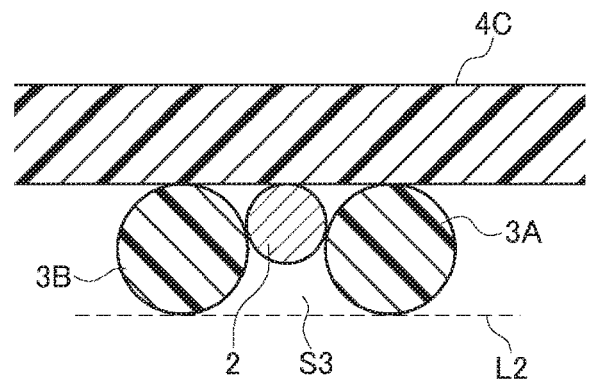
FIG. 5 is a sectional view taken along line V-V of FIG. 2.
Figure 6:
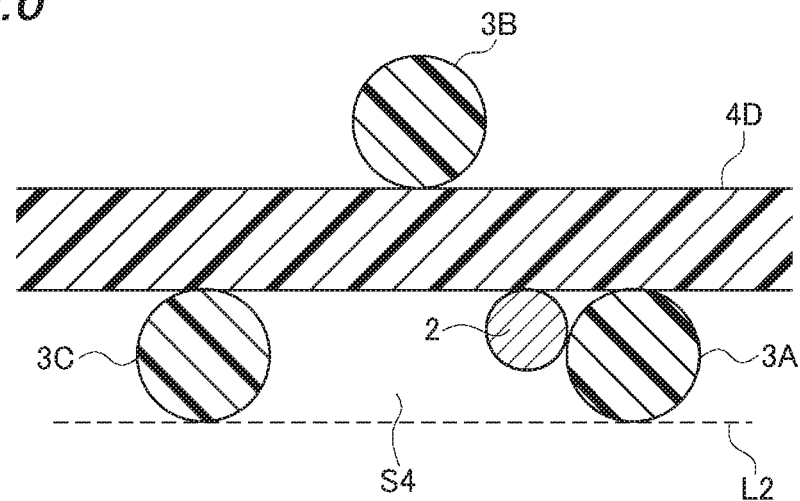
FIG. 6 is a sectional view taken along line VI-VI of FIG. 2.

As illustrated in FIG. 5, in a place where the conductive yarn 2 intersects with the weft yarn 4C, a bottom of the conductive yarn 2 is located to be higher than bottoms of the non-conductive yarns 3A and 3B that are adjacent thereto. Further, as illustrated in FIG. 6, in a place where the conductive yarn 2 intersects with the weft yarn 4D, the bottom of the conductive yarn 2 is located to be higher than the bottom of the non-conductive yarn 3A and a bottom of the non-conductive yarn 3C that is adjacent to the non-conductive yarn 3B.

When a lower surface of the webbing 1 is in slidably contact with another member, the conductive yarn 2 is located in spaces S3 and S4 surrounded by a sliding surface L2, the non-conductive yarns 3A to 3C, and the weft yarns 4C and 4D of the associated member, and the bottom of the conductive yarn 2 is not in contact with the associated member or a frictional force may be suppressed even if there is contact between the conductive yarn and the associated member. Thus, the abrasion of the conductive yarn 2 is suppressed.

Further, since the conductive yarn 2 is multifilament yarn produced by joining a plurality of conductive filaments, it is possible to obtain high conductivity.

In an example of FIG. 1, the conductive yarn 2 is formed at a central portion in a width direction that is perpendicular to a longitudinal direction of the webbing 1, but a position of the conductive yarn 2 is not limited thereto.

A plurality of conductive yarns 2 may be formed in the webbing 1. As described above, in order to protect the conductive yarn 2 from being rubbed against another member, the non-conductive yarns 3A and 3B adjacent to the conductive yarn 2 and the non-conductive yarn 3C adjacent to the non-conductive yarn 3B are utilized. Thus, in the case of forming the plurality of conductive yarns 2, at least one non-conductive yarn 3 is preferably disposed between the conductive yarns 2 and 2, and likewise, two or more non-conductive yarns 3 are preferably disposed between the conductive yarns.

Figure 7:
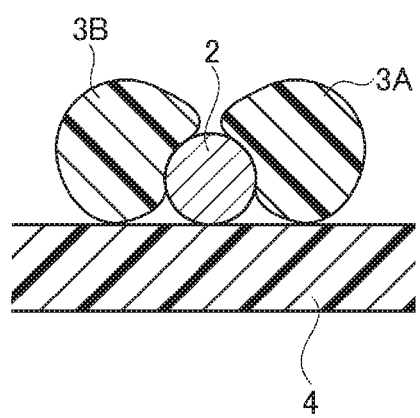
FIG. 7 is a sectional plan view illustrating the webbing according to the embodiment.

As illustrated in FIG. 7, the conductive yarn 2 may penetrate into two adjacent non-conductive yarns 3A and 3B, so that the non-conductive yarns 3A and 3B may cover the conductive yarn 2.

Figure 8:
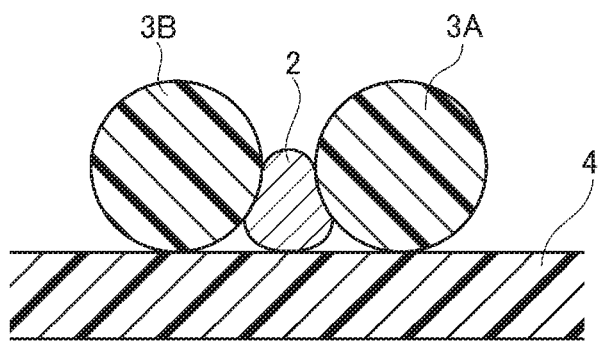
FIG. 8 is a sectional view illustrating a webbing according to another embodiment of the invention.

As illustrated in FIG. 8, the conductive yarn 2 may have sectional shapes other than a circular shape.

Figure 9:
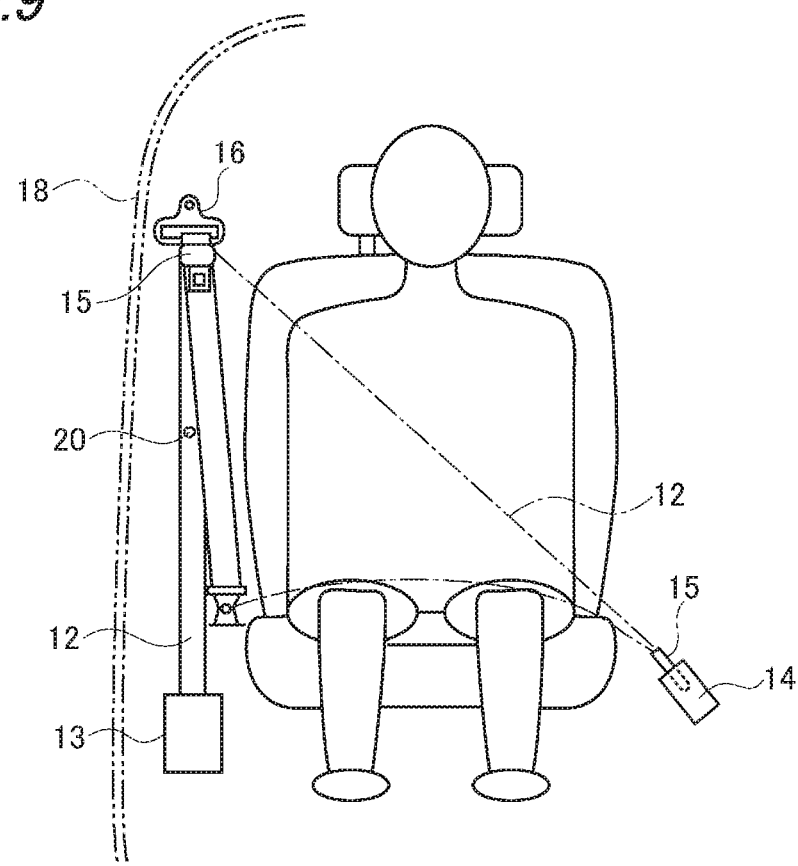
FIG. 9 is a schematic view illustrating the configuration of a seat belt apparatus.

FIG. 9 is a schematic view illustrating a seat belt apparatus that uses the webbing 1 as a seat belt. The seat belt apparatus includes a seat belt 12 that uses the webbing 1, a retractor 13 on which the seat belt 12 is wound such that one side thereof is drawn out, a buckle 14 that is fixed to the vehicle 18, a tongue 15 that is slidably formed on the seat belt 12 and engages with the buckle 14, and a shoulder anchor 16 into which the seat belt 12 is fitted.

The seat belt 12 slides with several members of the seat belt apparatus. As described above, in the webbing 1 forming the seat belt 12, the conductive yarn 2 is thinner than the non-conductive yarn 3 and is suppressed from being worn out, thus preventing the yarn from being broken due to the abrasion of the conductive yarn 2.

Figure 10:
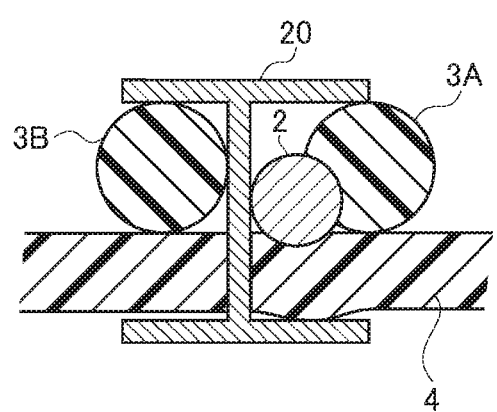
FIG. 10 is a sectional view illustrating a webbing according to another embodiment of the invention.

As illustrated in FIGS. 9 and 10, an electric device 20 that is electrically connected to the conductive yarn 2 is formed on the seat belt 12. The electric device 20 includes, for example, a microphone, a speaker, a biosensor, a sensor for detecting a belt pulling amount, a heater material, a weight detecting sensor of a lashing belt or the like. Since the abrasion of the conductive yarn 2 is suppressed, the seat belt 12 may operate the electric device 20 under good environment.

The above-described embodiment is an example of the invention, and the invention may be embodied in various ways without being limited to this embodiment.

What is claimed is:

1. A webbing for a passenger restraint belt forming a long passenger restraint belt to restrain a vehicle passenger comprising:
    warp yarns and weft yarns that are woven so as to extend orthogonally to each other,
    wherein the warp yarn includes at least one conductive yarn and non-conductive yarns,
    a non-conductive yarn is thicker than the at least one conductive yarn, and
    the conductive yarn is formed by convergence of a plurality of conductive filaments.

2. The webbing for the passenger restraint belt according to claim 1, wherein the one conductive yarn is formed between the two non-conductive yarns.

3. A seat belt including a passenger restraint belt formed using the webbing according to claim 1.

4. A seat belt apparatus comprising:
the seat belt according to claim 3;
a retractor that is configured to wind the seat belt;
a buckle that is fixed to a vehicle; and
a tongue that is provided on the seat belt and that is engages with the buckle.

5. The seat belt apparatus according to claim 4, wherein an electric device connected electrically to the conductive yarn is provided on the seat belt.

6. A webbing for a passenger restraint belt forming a long passenger restraint belt to restrain a vehicle passenger comprising:
warp yarns and weft yarns that are woven so as to extend orthogonally to each other,
wherein the warp yarn includes at least one conductive yarn and non-conductive yarns,
a non-conductive yarn is thicker than the at least one conductive yarn, and
the warp yarn includes a plurality of conductive yarns.

7. The webbing for the passenger restraint belt according to claim 6, wherein at least one non-conductive yarn is disposed between first and second conductive yarns.

8. A seat belt including a passenger restraint belt formed using the webbing according to claim 6.

9. A seat belt apparatus comprising:
the seat belt according to claim 8;
a retractor that is configured to wind the seat belt;
a buckle that is fixed to a vehicle; and
a tongue that is provided on the seat belt and that is engages with the buckle.

10. The seat belt apparatus according to claim 9, wherein an electric device connected electrically to the conductive yarn is provided on the seat belt.

* * * * *